United States Patent
Schmid et al.

(10) Patent No.: US 9,166,408 B2
(45) Date of Patent: Oct. 20, 2015

(54) DEMAND RESPONSE MANAGEMENT SYSTEM AND METHOD WITH VAR SUPPORT

(75) Inventors: James Joseph Schmid, Acworth, GA (US); Jason Wayne Black, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 945 days.

(21) Appl. No.: 13/108,510

(22) Filed: May 16, 2011

(65) Prior Publication Data

US 2012/0292994 A1    Nov. 22, 2012

(51) Int. Cl.
*H02J 3/16*     (2006.01)
*H02J 3/18*     (2006.01)
*H02J 13/00*    (2006.01)

(52) U.S. Cl.
CPC .............. *H02J 3/16* (2013.01); *H02J 3/1828* (2013.01); *H02J 13/0062* (2013.01); *H02J 13/0079* (2013.01); *H02J 13/0086* (2013.01); *Y02E 40/34* (2013.01); *Y02E 40/74* (2013.01); *Y02E 60/726* (2013.01); *Y02E 60/7838* (2013.01); *Y04S 10/22* (2013.01); *Y04S 10/24* (2013.01); *Y04S 40/124* (2013.01); *Y10T 307/406* (2015.04)

(58) Field of Classification Search
None
See application file for complete search history.

(56) References Cited

U.S. PATENT DOCUMENTS

| | | | |
|---|---|---|---|
| 5,696,695 A * | 12/1997 | Ehlers et al. | 700/286 |
| 7,747,739 B2 | 6/2010 | Bridges et al. | |
| 7,844,370 B2 | 11/2010 | Pollack et al. | |
| 2011/0109280 A1 * | 5/2011 | Edris | 323/210 |

FOREIGN PATENT DOCUMENTS

JP    2010200517 A  *  9/2010

* cited by examiner

*Primary Examiner* — Rexford Barnie
*Assistant Examiner* — Terrence Willoughby
(74) *Attorney, Agent, or Firm* — Sutherland Asbill & Brennan LLP

(57) ABSTRACT

A method for providing VAR support in a power distribution network having a demand response management system can include querying the demand response management system for an inductive device on the power distribution network and power cycling the inductive device to effect reactive power in the power distribution network.

20 Claims, 3 Drawing Sheets

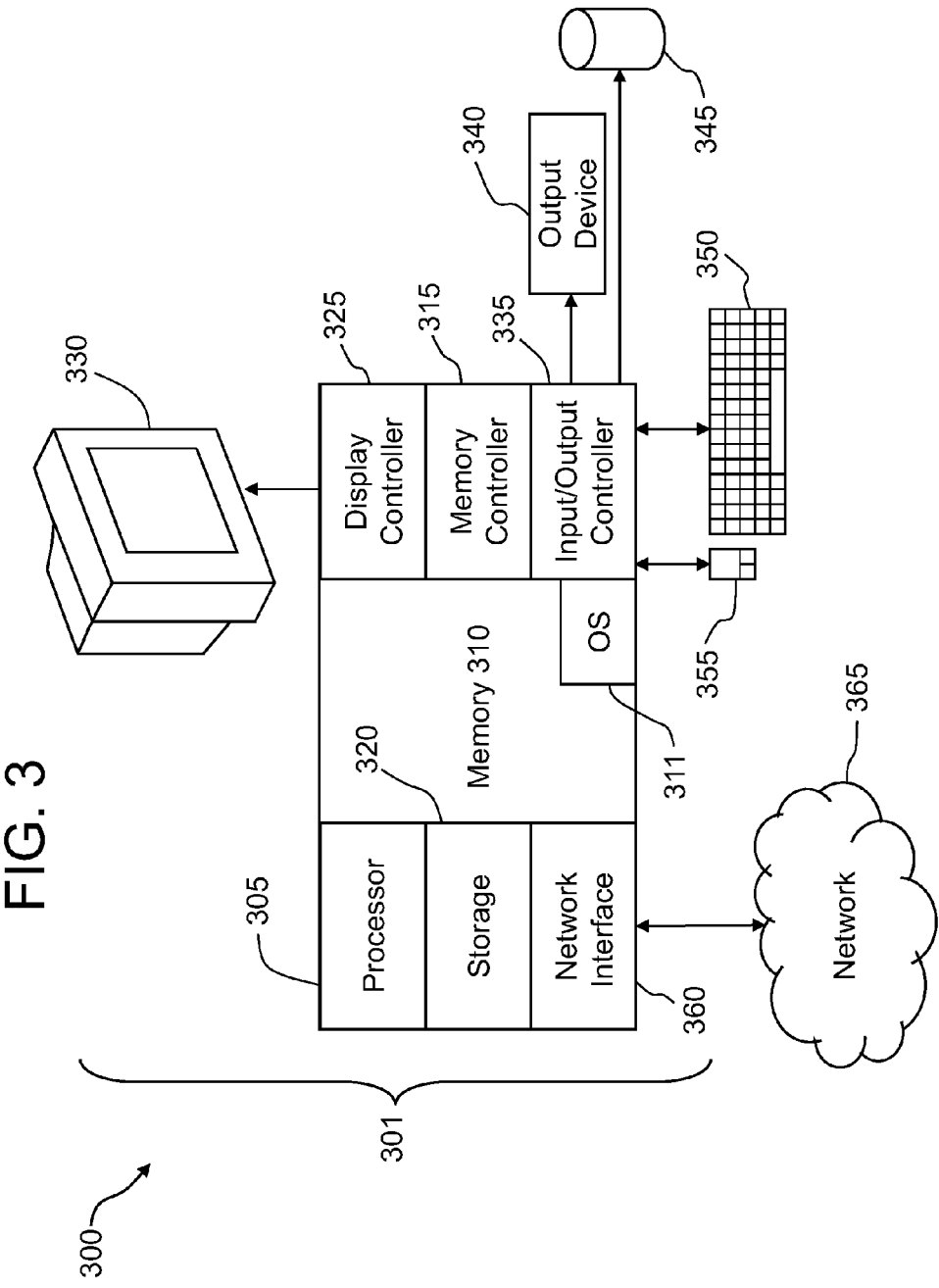

DEMAND RESPONSE MANAGEMENT SYSTEM AND METHOD WITH VAR SUPPORT

BACKGROUND OF THE INVENTION

The subject matter disclosed herein relates to electric power systems and more particularly to VAR support using demand response management systems.

Reactive power occurs when apparatuses with inductance or capacitance return power to the power system supplying the power to the apparatus. For example, an electrical appliance contains inductance and capacitance. During portions of the alternating current (AC) cycle, the appliance stores energy, and during other portions of the AC cycle, the appliance returns the energy. As such, electrical energy from the appliance periodically returns to the power system, and the energy flows back and forth across the power lines. This phenomena leads to extra current in the power lines, which can cause wasted energy in the form of heated power lines, as well as voltage drops in the power distribution circuits. "VAR" is volt-amperes-reactive and is the term used to describe reactive power. VAR support is implemented in order to manage the voltage drops in the power system.

What is needed is VAR support that actively manages inductive and capacitive devices in a power distribution network.

BRIEF DESCRIPTION OF THE INVENTION

According to one aspect of the invention, a method for providing VAR support in a power distribution network having a demand response management system is described. The method can include querying the demand response management system for an inductive device on the power distribution network and power cycling the inductive device to effect reactive power in the power distribution network.

According to another aspect of the invention, a system for providing VAR support in a power distribution network is described. The system can include a demand response management system, a distribution management system coupled to the demand response management system, a smart meter coupled to the demand response management system, an inductive device coupled to the smart meter, an integrated volt/VAR control process residing on the distribution management system, and configured for querying the demand response management system for inductive device data on the power distribution network and power cycling the inductive device to effect reactive power in the power distribution network.

According to yet another aspect of the invention, a computer program product for providing VAR support in a power distribution network having a demand response management system is described. The computer program product can include instructions for causing a computer to implement a method, the method including querying the demand response management system for an inductive device on the power distribution network and power cycling the inductive device to effect reactive power in the power distribution network.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 illustrates an exemplary embodiment of a computing system for providing VAR support.

The detailed description explains embodiments of the invention, together with advantages and features, by way of example with reference to the drawings.

DETAILED DESCRIPTION OF THE INVENTION

Figure 1:
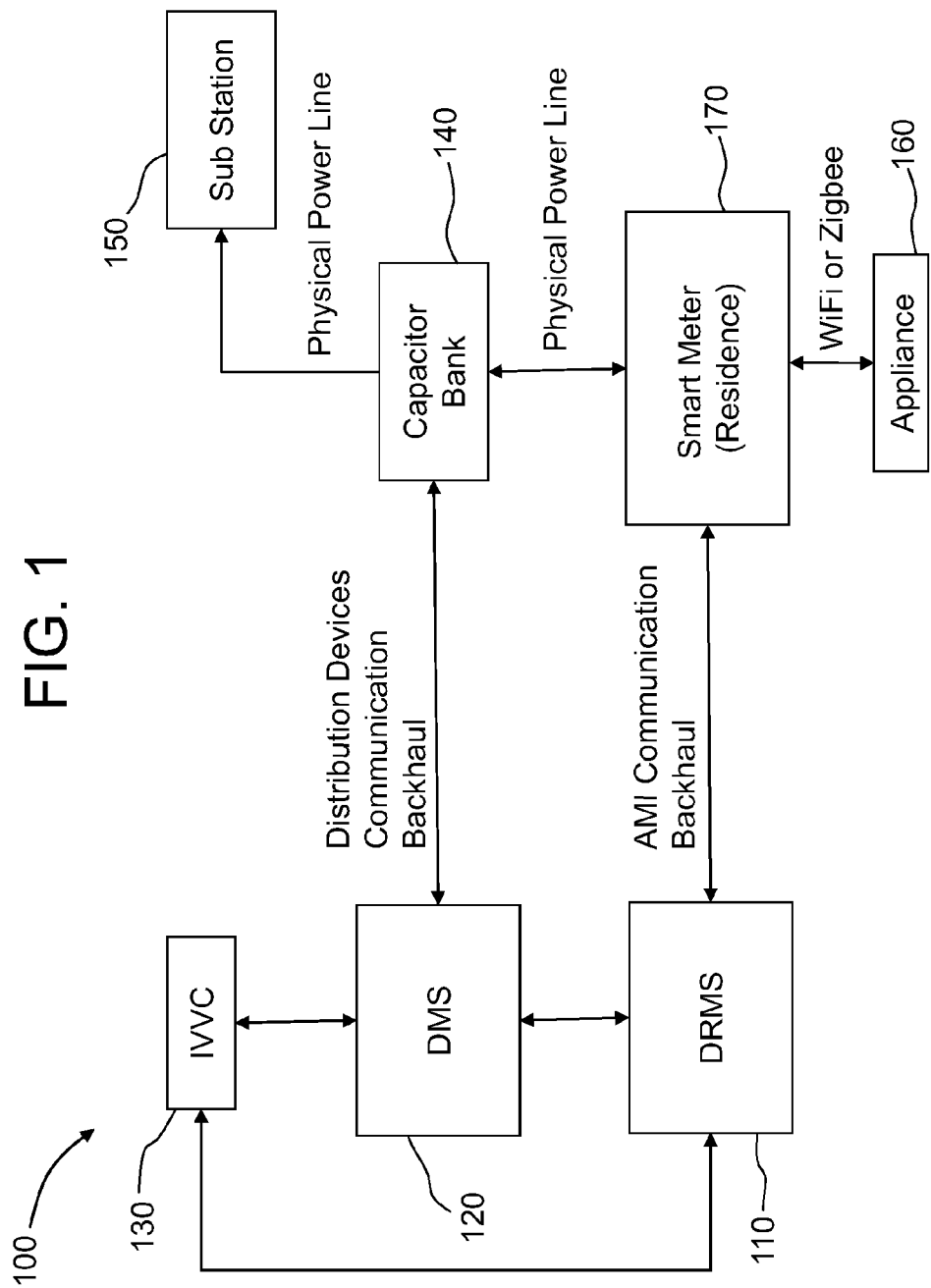
FIG. 1 illustrates an exemplary system for implementing demand response management system VAR support.

FIG. 1 illustrates an exemplary system 100 for implementing demand response management system VAR support. It will be appreciated that the system 100 is a part of a larger power distribution network controlled by a power utility. In exemplary embodiments, the system 100 can include a demand response management system (DRMS) 110, which is a utility operational system responsible for creating and managing demand response events that control end consumer electric power consumption. In exemplary embodiments, demand response events can be controlled by directly controlling end consumer devices (i.e., direct load control), or by sending variable power rates to end consumer devices (i.e., pricing control) to shift consumer electric power consumption behavior. As described further herein, the DRMS 110 is communicatively coupled to a consumer smart meter 170, which can be via an Automated Metering Infrastructure (AMI) communication backhaul as known in the art. The DRMS 110 can therefore have direct control and access to the smart meter 170. In exemplary embodiments, the smart meter 170 is an electrical meter that records consumption of electric energy in pre-determined time and communicates that information back to the DRMS 110 for monitoring and billing purposes. The smart meter 170 enables two-way communication between the meter and the DRMS 110 and gathers data for remote reporting.

In exemplary embodiments, the system 100 can further include a distribution management system (DMS) 120, which can be operatively coupled to the DRMS 110. The DMS 120 is an electric power utility operational system responsible for collecting data from and controlling all electric power distribution devices (e.g., switches, voltage regulators, and capacitor banks) on the power distribution network. The DMS 120 actively manages distribution devices to increase efficiency and reliability in the power distribution network. The DMS 120 can implement various applications in order to increase reliability and efficiency including but not limited to: optimal feeder reconfiguration (OFR), fault detection and restoration (FDIR), and integrated volt/VAR control (IVVC) 130. OFR finds the best choice of open (tie) points in the power network for enhanced load balancing. In order to limit the number of customers affected by an interruption due to a fault, distribution feeders in the power network are broken up into sections isolated by motorized switches or breakers. FDIR detects which section of the feeder the fault occurred, and isolates that feeder section by operating the isolating switches or breakers and restoring power to the non-faulted sections. Thus, only those customers on the faulted section are affected by a power outage.

As described herein, inductive loads such as air conditioners, furnaces, and dryers, can create VARs. Since residential meters only measure watts, and since the power utility bills consumers for watts, a goal of the power utility is to reduce the number of VARs consumed. Meters can measure VARs, and VAR support is provided to increase efficiency. Power utilities often control capacitor banks, such as capacitor bank 140 and distribution substations, such as Sub Station 150 to compensate for VAR losses. However, switching in the capacitor bank 140 due to high VAR consumption increases voltages, which may at times exceed mandated voltage limits. In exemplary embodiments, IVVC 130 maintains voltage levels and reduces VAR losses. In exemplary embodiments, the IVVC 130 is an application that can be maintained in the DMS 120, and provides coordinated control of the power network components, such as the capacitor bank 140 and the Sub Station 150, to seek a reduced VAR and voltage profile. As illustrated, the DMS 120 is also coupled to the capacitor bank 140 via a distribution devices communications backhaul, for example, as known in the art. The IVVC 130 continuously analyzes real time data and controls all of the power hardware on the system 100, such as the capacitor bank 140 and the Sub Station 150 (and other hardware not shown including but not limited to: load tap changers (LTCs) and voltage regulators), to manage the system power factor and voltage. The IVVC 130 allows the power utility to flatten voltage profiles and to lower average voltages. It often results in significant energy savings while simultaneously maintaining utility power factor to eliminate technical losses. In addition, the IVVC 130 enables conservation voltage reduction (CVR) in the system 100. CVR is a process by which the utility systematically reduces voltages in its distribution network, resulting in a proportional reduction of load on the network. The IVVC 130 improves system reliability, efficiency, and productivity by managing the voltage profile and power factor, reducing line losses, deferring the costs of new installations, and reducing equipment maintenance costs. The IVVC 130 also incorporates historical data that helps to determine the effect of each operation. The IVVC 130 includes engines to meet the power utility's desired power factor and voltage targets and resolve any conflicts between the two parameters. The application evaluates and controls LTC and regulator set points and tap positions, as well as capacitor bank states, in order to maintain target voltages in the distribution grid. The IVVC 130 also evaluates and controls capacitor bank states to manage feeder and substation VAR flows, which allows the utility to maintain a power factor as close to utility as possible.

As described herein, the system 100 can further include a consumer appliance 160 and the smart meter 170 communicatively coupled to the appliance 160. In exemplary embodiments, the appliance 160 can be coupled to the smart meter 170 via any suitable communications medium such as but not limited to a wireless WiFi connection. The smart meter 170 can be communicatively coupled to the DRMS 110 under a prior agreement as discussed herein. In this way, the DRMS 110 can manage the appliance 160 directly via the smart meter 170. For example, the appliance 160 can be an air conditioner, and the DRMS 110 can control the thermostat of the air conditioner directly turning the air conditioner on and off (i.e., power cycling the air conditioner) depending on the time of day and the demand that exists during the time of day in order to control reactive power in the system 100. In return, the consumer can receive an overall lower power rate. Only one appliance 160 and smart meter 170 are shown for illustrative purposes. It will be appreciated that the system 100 and power network can include numerous appliances and smart meters. In addition, only one capacitor bank 140 and substation 150 are shown. It will also be appreciated that various other capacitor banks, substations and other power components are included in the larger power distribution network. The capacitor banks, substations and other power components in the system and ultimately the consumer location can be coupled to one another by physical power lines as known in the art.

In exemplary embodiments, the DRMS 110 includes a record of all consumer induction devices, such as the appliance 160, in the power network that has been registered by the consumer. In exemplary embodiments, the power utility can make an estimation of the VARs that are generated when a device such as the appliance 160 is power cycled. In this way, the DRMS 110 can include a record of how much shift occurs between the voltage and current waves generated in the system 100. Conventionally, the DRMS 110 can implement the IVVC 130 to look at individual capacitor banks such as the capacitor bank 140 and power cycle the capacitor banks to provide VAR support in the system 100. As known in the art, power is a function of the product of voltage and current. Maximum power is generated when the voltage and current waves are in phase. By controlling the capacitor banks as described herein, the power utility can push the current wave back into phase with the voltage wave. In this way, the capacitor banks slow the current wave in the system 100 but maintain the voltage wave, thereby providing VAR support in the system 100. The voltage wave instead pushes the current wave back to a position that helps to increase power in the systems. However, repeatedly power cycling the capacitor bank 140 in this manner can decrease the effective life of the capacitor bank.

As described herein, the system 100 includes numerous consumer appliances that are coupled to smart meters. As such the power utility has control access to the various appliances. In exemplary embodiments, since the appliances themselves generate reactive power in the system 100 as described herein, the power utility can modify the IVVC in the system to manipulate the appliances in the system 100 to provide VAR support. By power cycling the appliances (such as the appliance 160), the power utility can replicate controls where the power utility is power cycling the capacitor banks (such as the capacitor bank 140) in the system to provide VAR support. In this way, the system 100 can include "virtual capacitor banks" within the system 100 by coordinated power cycling of appliances in the system 100. As described herein, if the consumer is already on a plan in which the consumer agrees to have the power utility power cycle the consumer's appliance(s), the power utility can plan and coordinate the agreed upon power cycling of the appliances as part of VAR support in the system 100.

As such, in response to a determination by the power utility that VAR support is required in the system 100, the power utility can initiate a coordinated power cycling of appliances (e.g., the appliance 160). During times when VAR support is desired in the system 100, the DRMS 110 is queried to provide the collection of inductive devices on the system. The devices are turned off to provide VAR support to the system 100 or turned on when VAR support is not required, which can help regulate the voltage in the power distribution network. By scheduling when inductive devices are power cycled, voltage drops in the system 100 can be managed by way of VAR support.

Figure 2:
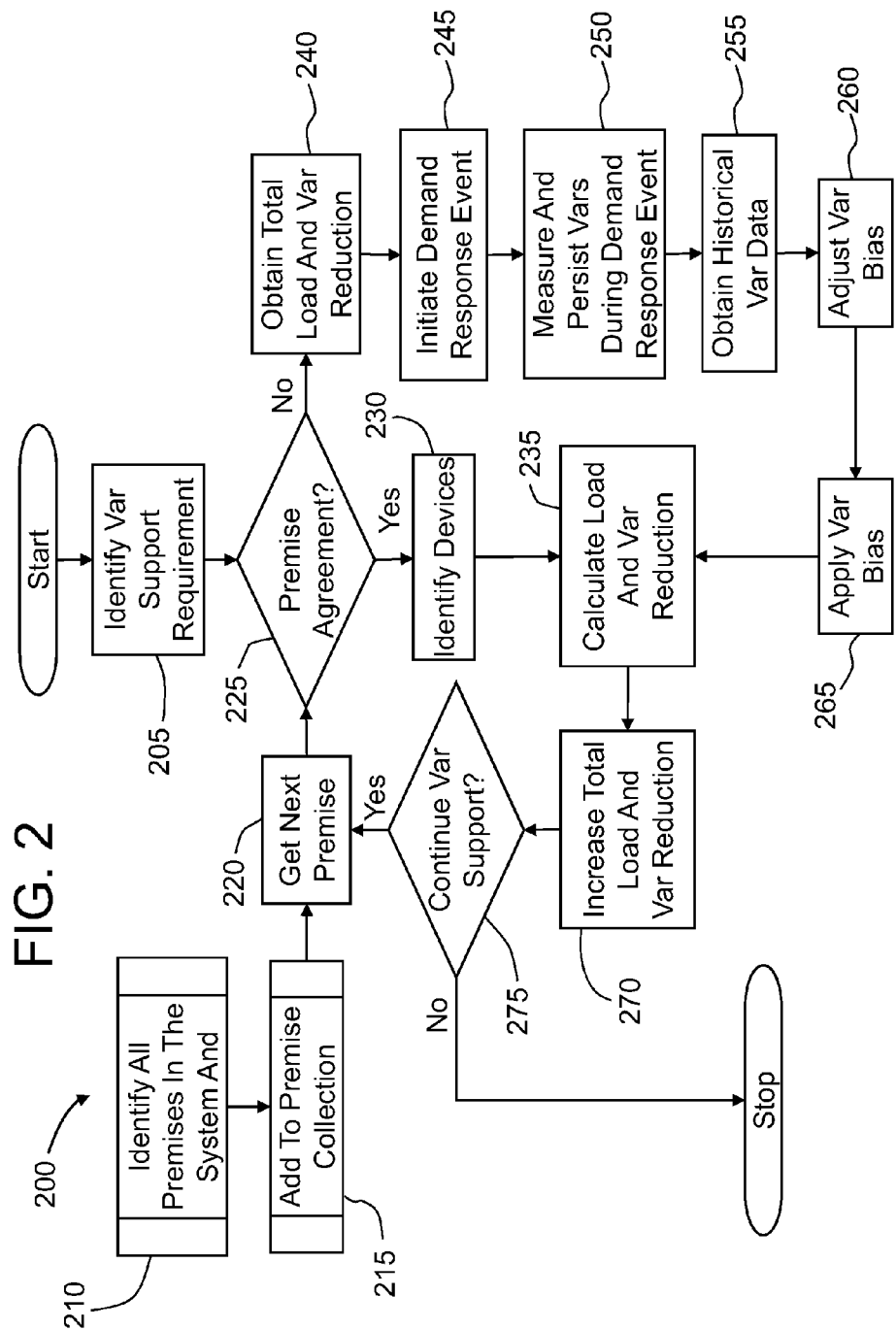
FIG. 2 illustrates a flowchart of a method of providing VAR support in accordance with exemplary embodiments.

FIG. 2 illustrates a flowchart of a method 200 of providing VAR support in a power network (e.g., the system 100) by coordinated power cycling of appliances (e.g., the appliance 160) in accordance with exemplary embodiments. At block 205, the power utility identifies an event in the power network that may require VAR support. For example, during any day there are peak uses, say in residential areas. In addition, there may be also a possibility of a blackout. As such, the power utility may want to initiate a demand response event in which the power utility alters power distribution in the system 100. As described herein, the power utility may have agreements in place with consumers in the system 100 in which the power utility will control the smart meters 170, for example, during times in which VAR support is required, such as during a demand response event. As such, at block 210, all consumer premises are identified within the system 100. At block 215, there is a collection of premises that is stored at the DRMS 110, which is queried during the time in which VAR support is needed. Data for each premise is retrieved at block 220, and at block 225 the power utility determines if there is a premise agreement in place. If there is a premise agreement in place at block 225, then at block 230, the power utility identifies inductive devices (such as the appliance 160 that are registered under the premise agreement for demand response and VAR support, and therefore available for power cycling to simulate virtual capacitor banks as described herein. In exemplary embodiments, the DRMS 110 dispatches VARs based on ranking VAR groups, which includes the determination of the registered devices under the premise agreements. The DRMS 110 can therefore select the groups of registered devices from the VAR group. The DRMS 110 can then determine if there is sufficient VAR support. If there is not sufficient VAR support, then the DRMS 110 can update the group of registered devices. At block 235, the power utility can then calculate load and VAR reduction based on device types registered for demand response and also calculate the percentage of historical demand response event participation and VAR bias. In exemplary embodiments, VAR estimation can generate an initial algorithm for estimating VAR response of participating devices in the VAR group. The estimate can be updated after each VAR demand response event. Initial and updated estimation algorithms can then be implemented to determine VAR availability and dispatch. At block 270, the power utility can then increase the total load and VAR reduction based on the results of the premise agreement and which devices can be power cycled. At block 275, the power utility can determine if further VAR support is required.

If further VAR support is required at block 275, then the next premise can be retrieved at block 220. At block 225, the power utility determines if there is a premise agreement in place. If there is not premise agreement in place at block 225, then at block 240, the power utility obtains the total load and VAR reduction data from the power distribution network, which can be stored in the DRMS 110. At block 245, since there are no inductive devices to power cycle, the power utility can initiate the demand response event, which may include a brownout or power cycling capacitor banks, such as the capacitor bank 140, for example. At block 250, the power utility measure and persists the VARs that are consumed during the demand response event. At block 255, the power utility collects historical VAR data, which can be implemented subsequently (for example at block 235 as described herein). As described herein, the historical data provides a determination of how power cycling the devices affected the VAR support in the system 100. As such, the historical data can assist in present determinations of which devices to power cycle and for how long. At block 260, the power utility can adjust the VAR bias. In exemplary embodiments, the VAR bias is equal to the ratio of estimated VAR reduction and actual VAR reduction. At block 265, the power utility applies the VAR bias. At block 235, the power utility can then calculate load and VAR reduction based on device types registered for demand response and also calculate percentage of historical demand response event participation and VAR bias. At block 270, the power utility can then increase the total load and VAR reduction based on the results of the premise agreement and which devices can be power cycled. At block 275, the power utility can determine if further VAR support is required, and the method 200 can continue as described herein. If continued VAR support is not required at block 275, then method 200 may Stop.

The systems and methods described herein can be implemented by any suitable computing system. For example, the DMS 120 can include a computing system on which the IVVC 130 resides. FIG. 3 illustrates an exemplary embodiment of a computing system 100 for providing VAR support. The methods described herein can be implemented in software (e.g., firmware), hardware, or a combination thereof. In exemplary embodiments, the methods described herein are implemented in software, as an executable program, and are executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, a memory 310 coupled to a memory controller 315, one or more output devices 340, and one or more input and/or output (I/O) devices 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the VAR support methods described herein in accordance with exemplary embodiments and a suitable operating system (OS) 311. The OS 311 essentially controls the execution of other computer programs, such as the VAR support systems and methods as described herein, and provides scheduling, input-output control, file and data management, memory management, and communication control and related services.

The VAR support methods described herein may be in the form of a source program, executable program (object code), script, or any other entity comprising a set of instructions to be performed. If a source program, then the program needs to be translated via a compiler, assembler, interpreter, or the like, which may or may not be included within the memory 310, so as to operate properly in connection with the OS 311. Furthermore, the VAR support methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as output device 340, and I/O device 345 may include input devices, for example but not limited to a printer, a scanner, microphone, and the like. Finally, the output device 340, and I/O device 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, the network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input/output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The VAR support methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In exemplary embodiments, where the VAR support methods are implemented in hardware, the VAR support methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include but are not limited to querying the demand response management system for inductive devices in the system, which can be power cycled to provide VAR support in the system without the need to power cycle capacitor banks. The power cycling of inductive devices in the system enables regulation of voltage in the power distribution network.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for providing volts-amperes-reactive support in a power distribution network having a demand response management system (DRMS), the method comprising:
    querying the DRMS to select an inductive device at a consumer premise served by the power distribution network, wherein the inductive device is selected in response to determining that a premise agreement between a consumer associated with the consumer premise and a power utility associated with the power distribution network is in place;
    calculating an estimated voltage reduction of a load at the consumer premise and an estimated volts-amperes-reactive voltage reduction of the inductive device based at least in part on a device type of the load at the consumer premise and a device type of the inductive device;
    determining from a historical volts-amperes-reactive data of the inductive device a percentage of historical device participation in provided volts-amperes-reactive support and a volts-amperes-reactive bias, wherein the volts-amperes-reactive bias comprises a ratio of estimated voltage reduction of the inductive device and actual voltage reduction of the inductive device; and
    cycling a reactive power of the selected inductive device that includes the volts-amperes-reactive bias to provide the volts-amperes-reactive support to the power distribution network based at least in part on the premise agreement and the estimated voltage reduction of at least one of the load at the consumer premise and the inductive device.

2. The method as claimed in claim 1 wherein the inductive device is a consumer device.

3. The method as claimed in claim 1 wherein the inductive device is coupled to a smart meter.

4. The method as claimed in claim 3 wherein the DRMS controls the smart meter to power cycle the inductive device.

5. The method as claimed in claim 1 wherein power cycling the inductive device replicates power cycling a physical capacitor bank on the power distribution network.

6. The method as claimed in claim 5 wherein the inductive device is a virtual capacitor bank.

7. The method as claimed in claim 2 wherein the inductive device is registered in the power distribution network.

8. The method as claimed in claim 1 further comprising collecting historical data to determine effects of power cycling the inductive device.

9. The method as claimed in claim 8 further comprising applying historical data to determine whether to power cycle the inductive device.

10. The method as claimed in claim 1 further comprising adjusting a volts-amperes-reactive bias.

11. A system for providing volts-amperes-reactive support in a power distribution network, the system comprising:
- a demand response management system (DRMS);
- a distribution management system (DMS) coupled to the DRMS;
- a smart meter coupled to the DRMS;
- an inductive device coupled to the smart meter;
- an integrated control process residing on the DMS, and configured for:
  - querying the DRMS to select an inductive device at a consumer premise served by the power distribution network, wherein the inductive device is selected in response to determining that a premise agreement between a consumer associated with the consumer premise and a power utility associated with the power distribution network is in place;
  - calculating an estimated voltage reduction of a load at the consumer premise and an estimated volts-amperes-reactive voltage reduction of the inductive device based at least in part on a device type of the load at the consumer premise and a device type of the inductive device;
  - determining from a historical volts-amperes-reactive data of the inductive device a percentage of historical device participation in provided volts-amperes-reactive support and a volts-amperes-reactive bias, wherein the volts-amperes-reactive bias comprises a ratio of estimated voltage reduction of the inductive device and actual voltage reduction of the inductive device; and
  - cycling a reactive power of the selected inductive device that includes the volts-amperes-reactive bias to provide the volts-amperes-reactive support to the power distribution network based at least in part on the premise agreement and the estimated voltage reduction of at least one of the load at the consumer premise and the inductive device.

12. The system as claimed in claim 11 wherein power cycling the inductive device replicates power cycling physical capacitor banks on the power distribution network.

13. The system as claimed in claim 12 wherein the inductive device is a virtual capacitor bank.

14. The system as claimed in claim 11 wherein the inductive device is registered in the power distribution network.

15. The system as claimed in claim 11 wherein the integrated control process is further configured for collecting historical data to determine effects of power cycling the inductive device.

16. The system as claimed in claim 15 wherein the integrated control process is further configured for applying historical data to determine whether to power cycle the inductive device.

17. The system as claimed in claim 11 wherein the integrated control process is further configured for adjusting a volts-amperes-reactive bias.

18. A non-transitory computer program product for providing volts-amperes-reactive support in a power distribution network having a demand response management system (DRMS), the computer program product including instructions for causing a computer to implement a method, the method comprising:
- querying the DRMS to select an inductive device at a consumer premise served by the power distribution network, wherein the inductive device is selected in response to determining that a premise agreement between a consumer associated with the consumer premise and a power utility associated with the power distribution network is in place;
- calculating an estimated voltage reduction of a load at the consumer premise and an estimated volts-amperes-reactive voltage reduction of the inductive device based at least in part on a device type of the load at the consumer premise and a device type of the inductive device;
- determining from a historical volts-amperes-reactive data of the inductive device a percentage of historical device participation in provided volts-amperes-reactive support and a volts-amperes-reactive bias, wherein the volts-amperes-reactive bias comprises a ratio of estimated voltage reduction of the inductive device and actual voltage reduction of the inductive device; and
- cycling a reactive power of the selected inductive device that includes the volts-amperes-reactive bias to provide the volts-amperes-reactive support to the power distribution network based at least in part on the premise agreement and the estimated voltage reduction of at least one of the load at the consumer premise and the inductive device.

19. The computer program product as claimed in claim 18 wherein power cycling the inductive device replicates power cycling physical capacitor banks on the power distribution network, wherein the inductive device is a virtual capacitor bank.

20. The computer program product as claimed in claim 18, wherein the method further comprises:
- collecting historical data to determine effects of power cycling the inductive device;
- applying the historical data to determine whether to power cycle the inductive device; and
- adjusting a volts-amperes-reactive bias based on the historical data.

* * * * *